US012718749B2

(12) United States Patent
Seo et al.

(10) Patent No.: US 12,718,749 B2
(45) Date of Patent: Aug. 25, 2026

(54) PIXEL CIRCUIT, DISPLAY DEVICE INCLUDING THE PIXEL CIRCUIT AND ELECTRONIC DEVICE INCLUDING THE PIXEL CIRCUIT

(71) Applicant: Samsung Display Co., Ltd., Yongin-si (KR)

(72) Inventors: Youngwan Seo, Yongin-si (KR); Junghwan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/282,686

(22) Filed: Jul. 28, 2025

(65) Prior Publication Data

US 2026/0038426 A1 Feb. 5, 2026

(30) Foreign Application Priority Data

Jul. 30, 2024 (KR) ........................ 10-2024-0100988
Mar. 11, 2025 (KR) ........................ 10-2025-0031024

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/043* (2013.01); *G09G 2300/0819* (2013.01); *G09G 2310/08* (2013.01); *G09G 2330/021* (2013.01)

(58) Field of Classification Search
CPC .. G09G 3/32; G09G 3/3233; G09G 2300/043; G09G 2300/0819; G09G 2310/08; G09G 2330/021
See application file for complete search history.

(56) References Cited

U.S. PATENT DOCUMENTS

2020/0111418 A1* 4/2020 Nam .................... G09G 3/3233
2023/0245619 A1* 8/2023 Yoon .................... G09G 3/3233 345/691
2023/0252935 A1* 8/2023 Park .................... G09G 3/3233 345/55
2024/0212584 A1* 6/2024 Kim ......................... G09G 3/32
2024/0290270 A1* 8/2024 Lee ...................... G09G 3/3241
2025/0308439 A1* 10/2025 Kim ......................... G09G 3/32

FOREIGN PATENT DOCUMENTS

KR 10-2016-0018892 A 2/2016
KR 10-2020-0048652 A 5/2020

* cited by examiner

*Primary Examiner* — Andrew Sasinowski
(74) *Attorney, Agent, or Firm* — Womble Bond Dickinson (US) LLP

(57) ABSTRACT

A pixel circuit includes a first transistor including a first control electrode connected to a first node, a second control electrode connected to a second node, a first electrode connected to a third node and a second electrode connected to a fourth node, a second transistor, a third transistor, a fourth transistor including a control electrode, a first electrode and a second electrode connected to the third node, a fifth transistor including a control electrode, a first electrode receiving an initialization voltage and a second electrode connected to the fourth node, a first capacitor including a first electrode connected to the first node and a second electrode connected to the fourth node, a second capacitor including a first electrode connected to the second node and a second electrode connected to the fourth node and a light emitting element.

20 Claims, 14 Drawing Sheets

PIXEL CIRCUIT, DISPLAY DEVICE INCLUDING THE PIXEL CIRCUIT AND ELECTRONIC DEVICE INCLUDING THE PIXEL CIRCUIT

CROSS-REFERENCE TO RELATED APPLICATION(S)

The present application claims priority to and the benefit of Korean Patent Application No. 10-2024-0100988, filed on Jul. 30, 2024, and Korean Patent Application No. 10-2025-0031024, filed on Mar. 11, 2025, in the Korean Intellectual Property Office, the entire disclosures of each of which are incorporated herein by reference.

BACKGROUND

1. Field

Aspects of some embodiments of the present disclosure relate to a pixel circuit, a display device including the pixel circuit and an electronic device including the pixel circuit.

2. Description of the Related Art

Generally, a display apparatus includes a display panel and a display panel driver. The display panel generally includes a plurality of gate lines, a plurality of data lines and a plurality of pixels. The display panel driver generally further includes a gate driver providing a gate signal to the gate lines, a data driver providing a data voltage to the data lines and a driving controller controlling the gate driver and the data driver.

Recently, display devices which provide virtual reality (VR) or augmented reality (AR) have been gaining prominence. For this purpose, a display apparatus may desirably have a relatively low area and high integration. In this case, because a pitch occupied by the pixel circuit may be relatively narrowed, the number of transistors of the pixel circuit and the number of signals applied to the pixel circuit may have restriction.

The above information disclosed in this Background section is only for enhancement of understanding of the background and therefore the information discussed in this Background section does not necessarily constitute prior art.

SUMMARY

Aspects of some embodiments of the present disclosure relate to a pixel circuit, a display device including the pixel circuit and an electronic device including the pixel circuit. For example, aspects of some embodiments of the present disclosure relate to a pixel circuit, a display device including the pixel circuit and an electronic device including the pixel circuit in which an emission reliability and an integration relatively improved.

Aspects of some embodiments of the present disclosure include a pixel circuit having a low area and high integration.

Aspects of some embodiments of the present disclosure may further include a display device including the pixel circuit, Aspects of some embodiments of the present disclosure may further include an electronic device including the pixel circuit.

According to some embodiments, a pixel circuit may include a first transistor including a first control electrode connected to a first node, a second control electrode connected to a second node, a first electrode connected to a third node and a second electrode connected to a fourth node, a second transistor including a control electrode receiving a write gate signal, a first electrode receiving a data voltage and a second electrode connected to the first node, a third transistor including a control electrode receiving a compensation gate signal, a first electrode connected to the third node and a second electrode connected to the second node, a fourth transistor including a control electrode receiving an emission signal, a first electrode connected receiving a first power voltage and a second electrode connected to the third node, a fifth transistor including a control electrode receiving a bias gate signal, a first electrode receiving an initialization voltage and a second electrode connected to the fourth node, a first capacitor including a first electrode connected to the first node and a second electrode connected to the fourth node, a second capacitor including a first electrode connected to the second node and a second electrode connected to the fourth node and a light emitting element including a first electrode connected to the fourth node and a second electrode receiving a second power voltage.

According to some embodiments, the first capacitor may store the data voltage, and the second capacitor may store a threshold voltage of the first transistor.

According to some embodiments, the second power voltage may transition between a first voltage and a second voltage lower than the first voltage.

According to some embodiments, a frame period in which the pixel circuit is driven may include first to fifth period. According to some embodiments, in the first period, the first power voltage may have a first low voltage, the write gate signal may have an activation level, the compensation gate signal may have an activation level, the bias gate signal may have an activation level, the emission signal may have an activation level, and the data voltage may have a reference voltage.

According to some embodiments, in the second period following to the first period, the compensation gate signal may have an activation level, the bias gate signal may have an activation level, and the emission signal may have an inactivation level.

According to some embodiments, in the second period, the fifth transistor may apply the initialization voltage to the fourth node in response to the bias gate signal. According to some embodiments, in the second period, the third transistor may connect the third node and the second node in response to the compensation gate signal. According to some embodiments, the second capacitor may store a threshold voltage of the first transistor through a diode-connection.

According to some embodiments, the initialization voltage may be higher than the reference voltage.

According to some embodiments, the initialization voltage may be same or lower than the first low voltage.

According to some embodiments, in the second period, a negative gate-source voltage may be applied to the first transistor, and the threshold voltage of the first transistor may be positively shifted.

According to some embodiments, in the third period following to the second period, the write gate signal may have an activation level, and the data voltage may have a pixel data voltage. According to some embodiments, in the third period, the second transistor may apply the pixel data voltage to the first node in response to the write gate signal.

According to some embodiments, in the fourth period following to the third period, the bias gate signal may have an activation level, and the second power voltage may have a second low voltage lower than the first low voltage.

According to some embodiments, in the fifth period following to the fourth period, the emission signal may have an activation level, the bias gate signal may have an inactivation level, the second power voltage may have the second low voltage. According to some embodiments, in the fifth period, the first transistor may apply a driving current generated based on a voltage of the first node and a voltage of the second node to the light emitting element.

According to some embodiments, a display device may include a display panel including a pixel circuit, a gate driver configured to output a gate signal to the pixel circuit, an emission driver configured to output an emission signal to the pixel circuit, a data driver configured to apply a data voltage to the display panel and a driving controller configured to control the gate driver, the emission driver and the data driver. According to some embodiments, the pixel circuit may include a first transistor including a first control electrode connected to a first node, a second control electrode connected to a second node, a first electrode connected to a third node and a second electrode connected to a fourth node, a second transistor including a control electrode receiving a write gate signal, a first electrode receiving the data voltage and a second electrode connected to the first node, a third transistor including a control electrode receiving a compensation gate signal, a first electrode connected to the third node and a second electrode connected to the second node, a fourth transistor including a control electrode receiving the emission signal, a first electrode connected receiving a first power voltage and a second electrode connected to the third node, a fifth transistor including a control electrode receiving a bias gate signal, a first electrode receiving an initialization voltage and a second electrode connected to the fourth node, a first capacitor including a first electrode connected to the first node and a second electrode connected to the fourth node, a second capacitor including a first electrode connected to the second node and a second electrode connected to the fourth node and a light emitting element including a first electrode connected to the fourth node and a second electrode receiving a second power voltage.

According to some embodiments, the first capacitor may store the data voltage, and the second capacitor may store a threshold voltage of the first transistor.

According to some embodiments, a frame period in which the pixel circuit is driven may include a compensation period. According to some embodiments, in the compensation period, the write gate signal may have an activation level, the compensation gate signal may have an activation level, the bias gate signal may have an activation level, and the emission signal may have an inactivation level.

According to some embodiments, in the compensation period, the second transistor may apply a reference voltage to the first node in response to the write gate signal, and the fifth transistor may apply to initialization voltage to the fourth node in response to the bias gate signal. According to some embodiments, in the compensation period, the third transistor may connect the third node and the second node in response to the compensation gate signal. According to some embodiments, the second capacitor may store a threshold voltage of the first transistor through a diode-connection According to some embodiments, the initialization voltage mays be higher than the reference voltage.

According to some embodiments, in the compensation period, a negative gate-source voltage may be applied to the first transistor, and the threshold voltage of the first transistor may be positively shifted.

According to some embodiments, the compensation gate signal, the emission signal, the bias gate signal may be global signal which is applied to at least two pixel-rows of pixel-rows with a same timing.

According to some embodiments, an electronic device may include a display panel including a pixel circuit, a gate driver configured to output a gate signal to the pixel circuit, an emission driver configured to output an emission signal to the pixel circuit, a data driver configured to apply a data voltage to the display panel, a driving controller configured to control the gate driver, the emission driver and the data driver based on an input control signal and a processor configured to output the input control signal. According to some embodiments, the pixel circuit may include a first transistor including a first control electrode connected to a first node, a second control electrode connected to a second node, a first electrode connected to a third node and a second electrode connected to a fourth node, a second transistor including a control electrode receiving a write gate signal, a first electrode receiving the data voltage and a second electrode connected to the first node, a third transistor including a control electrode receiving a compensation gate signal, a first electrode connected to the third node and a second electrode connected to the second node, a fourth transistor including a control electrode receiving the emission signal, a first electrode connected receiving a first power voltage and a second electrode connected to the third node, a fifth transistor including a control electrode receiving a bias gate signal, a first electrode receiving an initialization voltage and a second electrode connected to the fourth node, a first capacitor including a first electrode connected to the first node and a second electrode connected to the fourth node, a second capacitor including a first electrode connected to the second node and a second electrode connected to the fourth node and a light emitting element including a first electrode connected to the fourth node and a second electrode receiving a second power voltage.

As described above, a pixel circuit may include few transistors, so that an integration of the pixel circuit may be relatively improved. Accordingly, the pixel circuit may be applied to high-resolution display device.

Additionally, a threshold voltage compensation operation may be performed in the diode connection manner in the pixel, so that a compensation ability of the pixel circuit according to some embodiments may be relatively improved compared with a pixel circuit in which a threshold voltage compensation operation is performed in a source follower manner.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, the present disclosure will be explained in detail with reference to the accompanying drawings.

Figure 1:
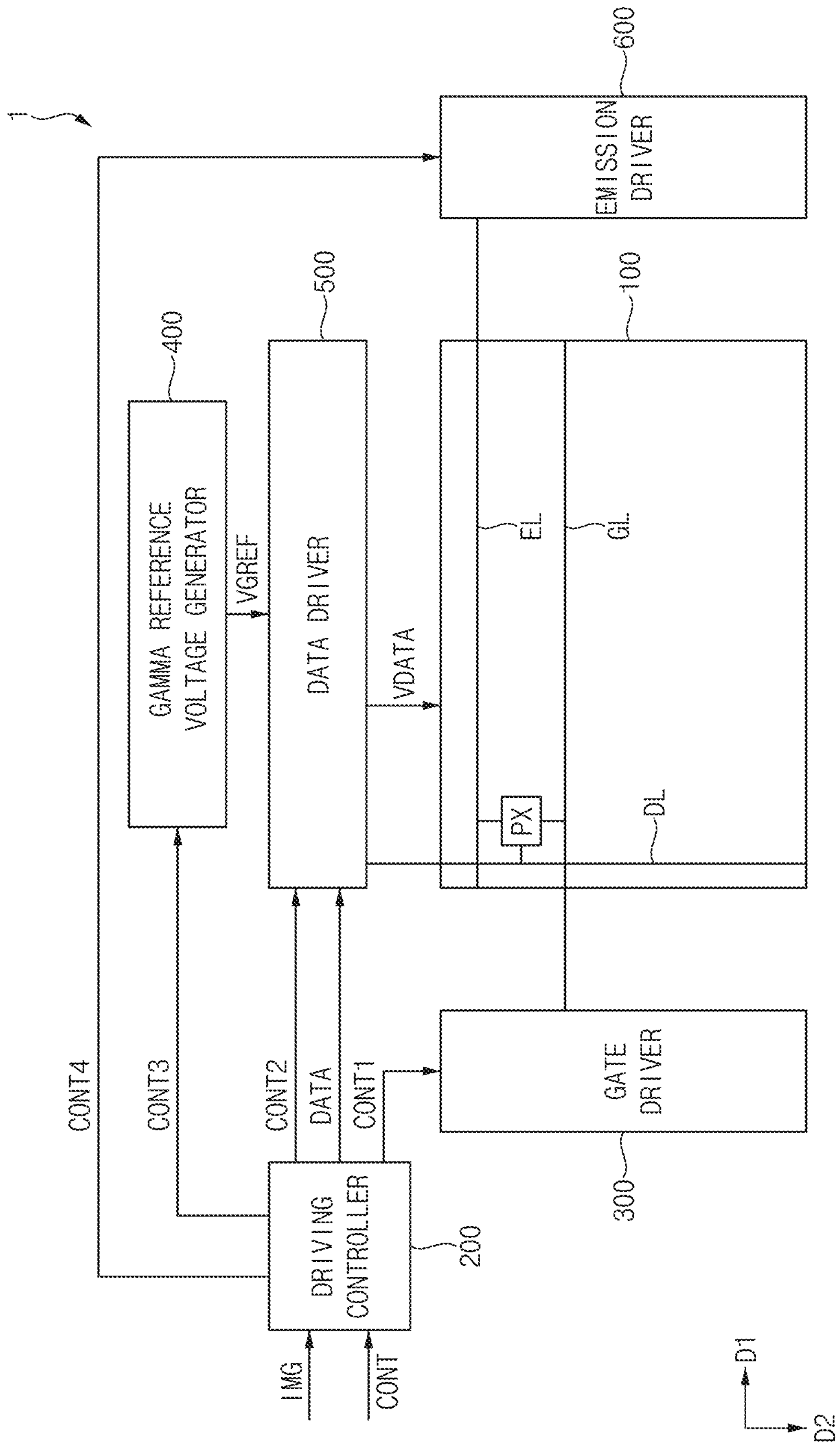
FIG. 1 is a block diagram illustrating a display device according to some embodiments of the present disclosure.

FIG. 1 is a block diagram illustrating a display device 1 according to some embodiments of the present disclosure.

Referring to FIG. 1, the display device 1 may include a display panel 100 and a display panel driver. The display panel driver 110 may include a driving controller 200, a gate driver 300, a gamma reference voltage generator 400, a data driver 500 and an emission driver 600.

The display panel 100 may have a display region a which images are displayed and a peripheral region adjacent to the display region.

The display panel 100 may include a plurality of gate lines GL, plurality of emission lines EL, a plurality of data lines DL and a plurality of pixel circuits PX electrically connected to the gate lines GL, the emission lines EL and the data lines DL. The gate lines GL may extend in a first direction D1, the emission lines EL may extend in the first direction D1 and the data lines DL may extend in a second direction D2 crossing the first direction D1.

The driving controller 200 may receive input image data IMG and an input control signal CONT from an external device. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate emission driver 300 based on the input control signal CONT, and output the first control signal CONT1 to the gate emission driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals driving the gate lines GL in response to the first control signal CONT1 received from the driving controller 200. The gate driver 300 may output the gate signals to the gate lines GL. For example, the gate signals may include a write gate signal GW and a compensation gate signal GC. According to some embodiments, the gate signals may further include a bias gate signal GB of FIG. 2.

According to some embodiments, the gate driver 300 may be located in the peripheral region. According to some embodiments, the gate driver 300 may be integrated in the peripheral region.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

According to some embodiments, the gamma reference voltage generator 400 may be located in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into a pixel data voltage having an analog type using the gamma reference voltages VGREF. The data voltage VDATA may include the pixel data voltage and a reference voltage. The data voltage VDATA may have the pixel data voltage or the reference voltage during a frame period in which the pixel circuit PX is driven. The data driver 500 may output the data voltage VDATA to the data line DL.

According to some embodiments, the data driver 500 may be located in the peripheral region. According to some embodiments, the data driver 500 may be integrated in the peripheral region.

Figure 2:
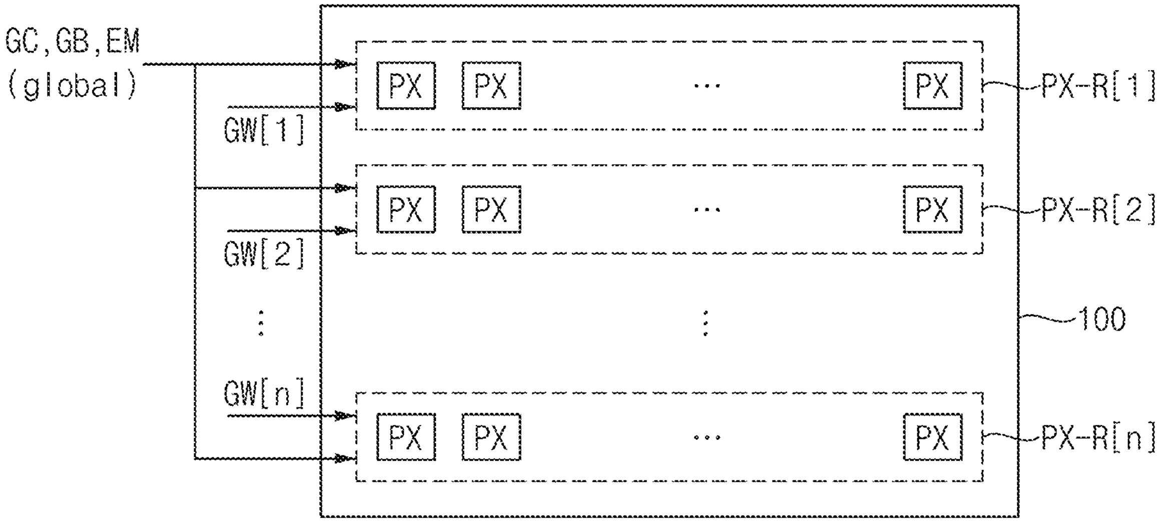
FIG. 2 is a block diagram illustrating an example of signals applied to a pixel circuit included in a display device of FIG. 1.

The emission driver 600 may generate the emission signal EM of FIG. 2 in response to the fourth control signal CONT4 received from the driving controller 200. The emission driver 600 may output the emission signal EM of FIG. 2 to the display panel 100.

According to some embodiments, the emission driver 600 may be located in the peripheral region. According to some embodiments, the emission driver 600 may be integrated in the peripheral region.

Although the gate driver 300 is located on a first side of the display panel 100, and the emission driver 600 is located on a second side of the display panel 100 in FIG. 1 for convenience of explanation, embodiments according to the present disclosure are not limited thereto. The gate driver 300 and the emission driver 600 may be located on the first side of the display panel 100. For example, the gate driver 300 and the emission driver 600 may be located on the peripheral region of the display panel 100 on the same side of the display region of the display panel 100. For example, the gate driver 300 and the emission driver 600 may be formed integrally with each other.

FIG. 2 is a block diagram illustrating an example of signals applied to a pixel circuit PX included in a display device 1 of FIG. 1.

Referring to FIG. 1 and FIG. 2, the display panel 100 may include a plurality of pixel-rows PX-R[1], PX-R[2] to PX-R[n]. The pixel-row may mean a plurality of the pixel circuits PX connected to a same write gate line. For example, the pixel circuits PX connected to the same write gate line may receive a same write gate signal GW[n]. Pixel circuits of the first pixel-row PX-R[1] may receive a first write gate signal GW[1]. Pixel circuits of the second pixel-row PX-R[2] may receive a second write gate signal GW[2]. Pixel circuits of the N-th pixel-row PX-R[n] may receive an N-th write gate signal GW[n].

According to some embodiments, the compensation gate signal GC[n] may be a global signal. The global signal may mean a signal which is applied to at least two pixel-rows of the pixel-rows PX-R[1], PX-R[2] to PX-R[n] with a same timing. For example, the global signal may mean a signal which is applied to all pixel circuits included in the display panel 100 with a same timing. According to some embodiments, the compensation gate signal GC may be the global signal. According to some embodiments, the bias gate signal GB may be the global signal. According to some embodiments, the emission signal EM may be the global signal.

According to some embodiments, the write gate signal GW[n] may be a progressive signal. The progressive signal may mean a signal which is applied to the pixel-rows PX-R[1], PX-R[2] to PX-R[n] with a different timing. According to some embodiments, the write gate signal GW[n] may be sequentially applied to the pixel-rows PX-R[1], PX-R[2] to PX-R[n].

According to some embodiments, the write gate signal GW[n] may be the progressive signal, and the compensation gate signal GC, the bias gate signa GB and the emission signal EM may be the global signal. The compensation gat signal GC may be the global signal, so that the number of stages generating the compensation gate signal GC may be relatively reduced. Additionally, the bias gate signal GB may be the global signal, so that the number of stages generating the bias gate signal GB may be relatively reduced. Additionally, the emission signal EM may be the global signal, so that the number of stages generating the emission signal EM may be relatively reduced. Accordingly, an integration of the display device 1 may be relatively improved. Additionally, a power consumption of the display device 1 may be relatively reduced.

Figure 3:
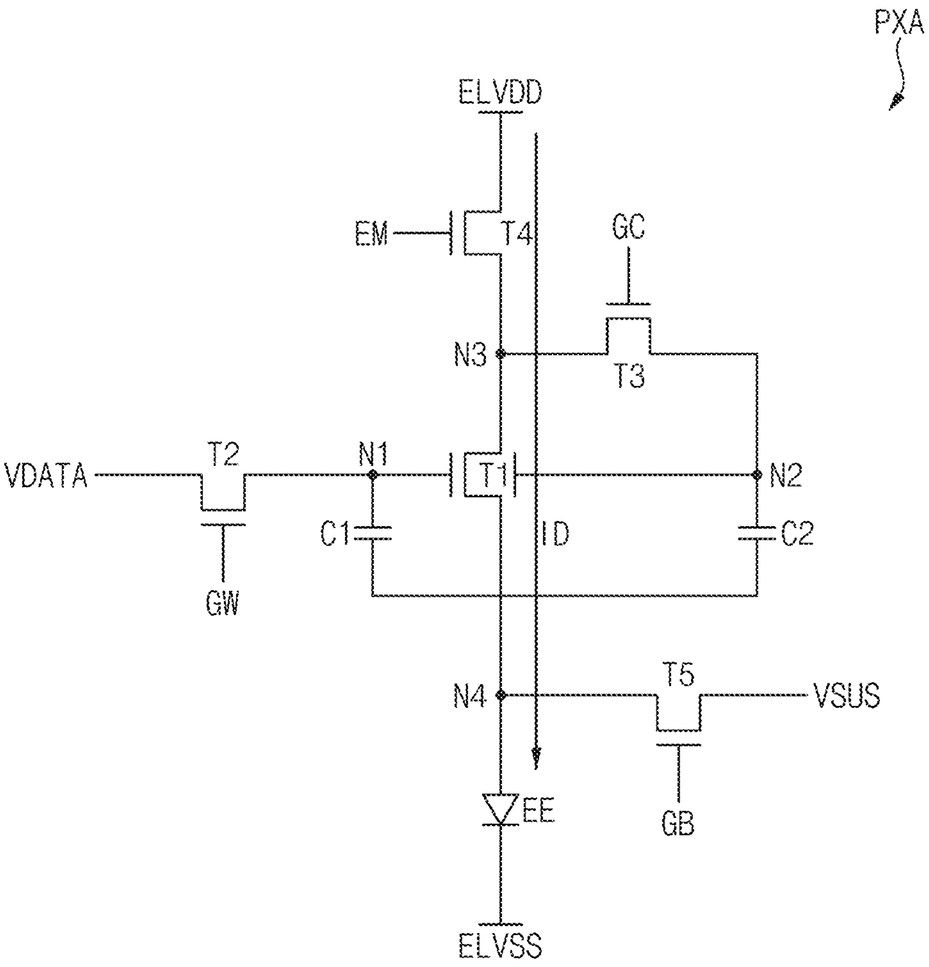
FIG. 3 is a circuit diagram illustrating an example of a pixel circuit PX included in a display device 1 of FIG. 1.

FIG. 3 is a circuit diagram illustrating an example of a pixel circuit PX included in a display device 1 of FIG. 1. Although FIG. 3 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring to FIG. 1 to FIG. 3, a pixel circuit PXA may include a first transistor T1, a second transistor T2, a third transistor T3, a fourth transistor T4, a fifth transistor T5, a first capacitor C1, a second capacitor C2 and a light emitting element EE.

The first transistor T1 may include a first control electrode connected to a first node N1, a second control electrode connected to a second node N2, a first electrode (e.g., drain) connected to a third node N3 and a second electrode (e.g., source) connected to a fourth node N4. The first transistor T1 may generate a driving current ID based on a voltage applied to the first control electrode and a voltage applied to the second control electrode. For example, the first transistor T1 may generate a voltage of the first node N1 and a voltage of the second node N2. For example, the first transistor T1 may be called as a driving transistor.

The first transistor T1 may have a double gate structure including the first control electrode and the second control electrode. For example, the first control electrode of the first transistor T1 may be called as a top gate. For example, the first control electrode of the first transistor T1 may be located above an active region of the first transistor T1, and the second control electrode of the first transistor T1 may be a bottom gate located under the active region of the first transistor T1. According to some embodiments, the active region may be formed by oxide semiconductor, and the first transistor T1 may be an oxide transistor.

According to some embodiments, the first control electrode of the first transistor T1 may be the top gate which is located above the active region of the first transistor, and the second control electrode of the first transistor T1 may be the bottom gate which is located under the active region of the first transistor. Additionally, a first electrode of the first capacitor C1 may be connected to the top gate of the first transistor T1, and a first electrode of the second capacitor C2 may be connected to the bottom gate of the first transistor T1, or may be formed integrally with the bottom gate of the first transistor T1.

The second transistor T2 may include a control electrode receiving the write gate signal GW, a first electrode receiving the data voltage VDATA and a second electrode connected to a first node N1. The second transistor T2 may apply the data voltage VDATA to the first node N1 in response to the write gate signal. For example, the second transistor T2 may be called as a writing transistor.

The third transistor T3 may include a control electrode receiving the compensation gate signal GC, a first electrode connected to the third node N3 and a second electrode connected to the second node N2. The third transistor T3 may connect the third node N3 and the second node N2 in response to the compensation gate signal GC. For example, the third transistor T3 may diode-connect the first transistor T1. For example, the third transistor T3 may be called as a compensation transistor.

The fourth transistor T4 may include a control electrode receiving the emission signal EM, the first electrode receiving a first power voltage ELVDD and a second electrode connected to the third node N3. The fourth transistor T4 may apply the first power voltage ELVDD to the third node N3 in response to the emission signal EM. For example, the fourth transistor T4 may be called as an emission transistor.

The fifth transistor T5 may include a control electrode receiving the bias gate signal GB, a first electrode receiving the initialization voltage VSUS and a second electrode connected to the fourth node N4. The fifth transistor T5 may apply the initialization voltage VSUS to the fourth node N4 in response to the bias gate signal GB. For example, the fifth transistor T5 may be called as a light emitting element initialization transistor.

The first capacitor C1 may be connected between the first node N1 and the fourth node N4. The first capacitor C1 may include a first electrode connected to the first node N1 and a second electrode connected to the fourth node N4. The first capacitor C1 may store the data voltage (or a voltage difference between the data voltage VDATA and the initialization voltage VSUS). For example, the first capacitor C1 may be called as a storage capacitor.

The second capacitor C2 may be connected between the second node N2 and the fourth node N4. The second capacitor C2 may include a first electrode connected to the second node N2 and a second electrode connected to the fourth node N4. The second capacitor C2 may store a threshold voltage of the first transistor T1. For example, the second capacitor C2 may be called as a threshold voltage capacitor or compensation capacitor.

The light emitting element EE may include a first electrode connected to the fourth node N4 and a second electrode receiving a second power voltage. The light emitting element EE may emit light based on the driving current ID. According to some embodiments, the light emitting element EE may be an organic light emitting diode (OLED), but embodiments according to the present disclosure are not limited thereto. According to some embodiments, the light emitting element EE may be a nano light emitting diode, quantum dot light emitting diode, micro light emitting diode, and in organic light emitting diode, or any other suitable light emitting element.

According to some embodiments, the first to fifth transistor T1 to T5 may be N-type metal oxide semiconductor transistors, but not limited thereto. Additionally, the first to fifth transistor T1 to T5 may be formed as oxide transistors having higher mobility than the poly-silicon transistors.

According to some embodiments, the pixel circuit PXA may have a 5T2C structure. The pixel circuit PXA may include few transistors, so that an integration of the pixel circuit PXA may be relatively improved. Accordingly, the pixel circuit PXA may be applied to high-resolution display device.

Figure 4:
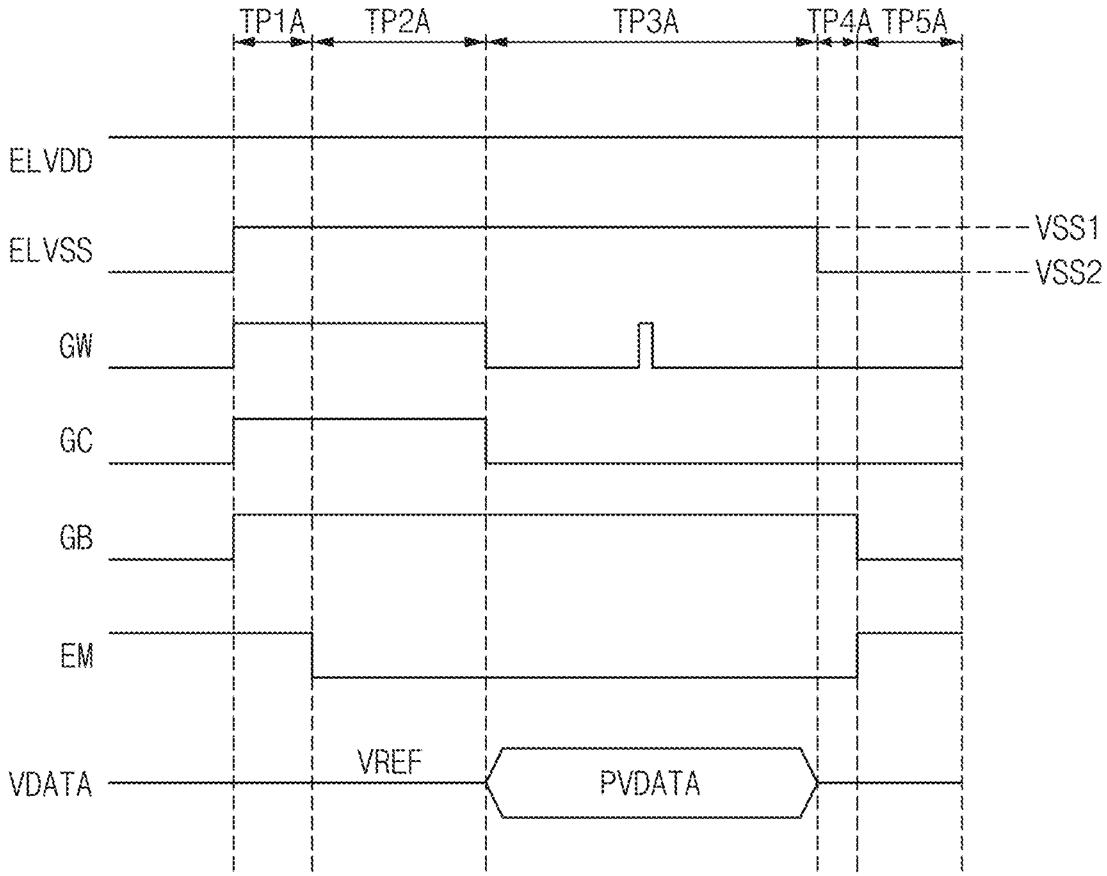
FIG. 4 is a timing diagram illustrating an example of signals applied to a pixel circuit PXA of FIG. 3.

FIG. 4 is a timing diagram illustrating an example of signals applied to a pixel circuit PXA of FIG. 3.

Referring to FIG. 1 to FIG. 4, a frame period in which the pixel circuit PXA is driven may include a first period TP1A, a second period TP2A, a third period TP3A, a fourth period TP4A and a fifth period TP5A.

In the first period TP1A, the second power voltage ELVSS may have a first low voltage VSS1, the write gate signal GW may have an activation level, the compensation gate signal GC may have an activation level, the bias gate signal GB may have an activation level, the emission signal EM may have an activation level, and the data voltage VDATA may have the reference voltage VREF. According to some embodiments, the first low voltage VSS1 may be a positive voltage. For example, the first period TP1A may be called as an initialization period. The second power voltage ELVSS may transition between a first voltage VSS1 and a second voltage VSS2 lower than the first voltage VSS1.

In the second period TP2A following to the first period TP1A, the second power voltage ELVSS may have the first low voltage VSS1, the write gate signal GW may have an activation level, the compensation gate signal GC may have an activation level, the bias gate signal GB may have an activation level, the emission signal EM may have an inactivation level, and the data voltage VDATA may have the reference voltage VREF. For example, the second period TP2A may be called as a compensation period.

In the third period TP3A following to the second period TP2A, the second power voltage ELVSS may have the first low voltage VSS1, the write gate signal GW may have an activation level, the compensation gate signal GC may have an inactivation level, the bias gate signal GB may have an activation level, the emission signal EM may have an inactivation level, and the data voltage VDATA may have the pixel data voltage PVDATA. For example, the third period TP3A may be called as a writing period.

In the fourth period TP4A following to the third period TP3A, the second power voltage ELVSS may have a second low voltage VSS2, the write gate signal GW may have an inactivation level, the compensation gate signal GC may have an inactivation level, the bias gate signal GB may have an activation level, the emission signal EM may have an inactivation level, and the data voltage VDATA may have the reference voltage VREF. For example, the fourth period TP4A may be called as an emission waiting period or a holding period.

In the fifth period TP5A following to the fourth period TP4A, the second power voltage ELVSS may have the second low voltage VSS2, the write gate signal GW may have an inactivation level, the compensation gate signal GC may have an inactivation level, the bias gate signal GB may have an inactivation level, the emission signal EM may have an activation level, and the data voltage VDATA may have the reference voltage VREF. For example, the fifth period TP5A may be called as an emission period.

Figure 5:
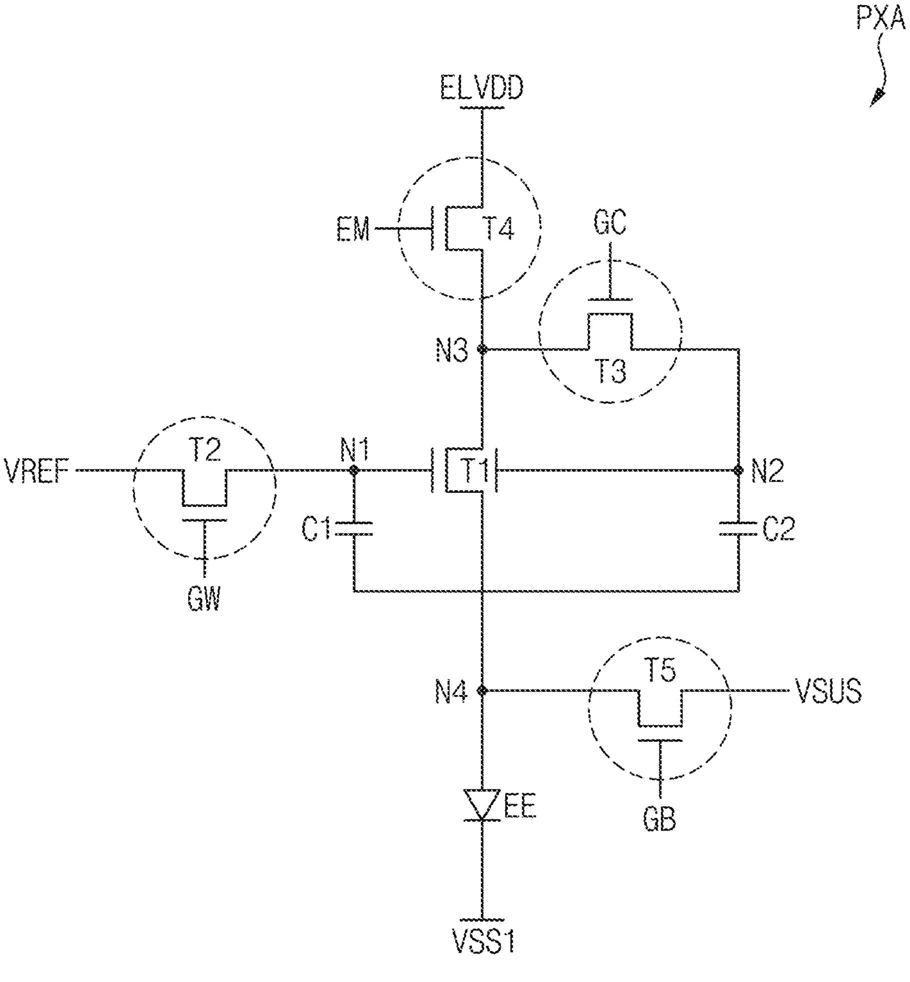
FIG. 5 is a circuit diagram illustrating an operation of a pixel circuit PXA of FIG. 3 in a first period TP1A of FIG. 4.

FIG. 5 is a circuit diagram illustrating an operation of a pixel circuit PXA of FIG. 3 in a first period TP1A of FIG. 4.

Referring to FIG. 1, FIG. 4 and FIG. 5, in the first period TP1A, the second transistor T2 may be turned on in response to the write gate signal GW. The second transistor T2 may be turned on, so that the reference voltage VREF may be applied to the first node N1. Accordingly, the first node N1 may be initialized as the reference voltage VREF. In the first period TP1A, the fourth transistor T4 may be turned on in response to the emission signal EM. In the first period TP1A, the third transistor T3 may be turned on in response to the compensation gate signal GC. The fourth transistor T4 and the third transistor T3 may be turned on, so that the first power voltage ELVDD may be applied to the third node N3 and the second node N2. Accordingly, the second node N2 and the third node N3 may be initialized as the first power voltage ELVDD. In the first period TP1A, the fifth transistor T5 may be turned on in response to the bias gate signal GB. The fifth transistor T5 may be turned on, so that the initialization voltage VSUS may be applied to the fourth node N4. The initialization voltage VSUS may be lower than the first low voltage VSS1. According to some embodiments, the initialization voltage VSUS may be substantially same as the first low voltage VSS1. In the first period TP1A, the first electrode (e.g., anode) of the light emitting element EE may receive the initialization voltage VSUS, and the second electrode (e.g., cathode) of the light emitting element EE may receive the first low voltage VSS1. The initialization voltage VSUS may be lower than the first low voltage VSS1, so that the light emitting element EE may stop emitting.

Figure 6:
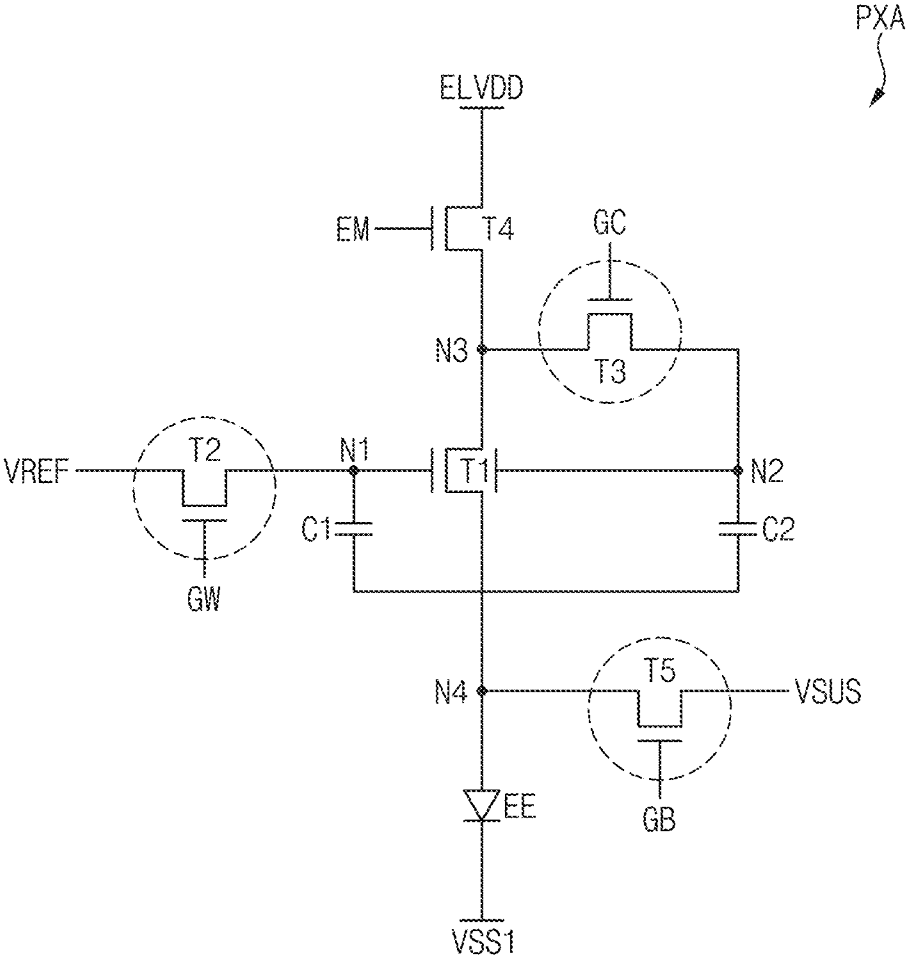
FIG. 6 is a circuit diagram illustrating an operation of a pixel circuit PXA of FIG. 3 in a second period TP2A of FIG. 3.

FIG. 6 is a circuit diagram illustrating an operation of a pixel circuit PXA of FIG. 3 in a second period TP2A of FIG. 3.

Referring to FIG. 1, FIG. 4 and FIG. 6, in the second period TP2A, the fourth transistor T4 may be turned off in response to the emission signal EM. In the second period TP2A, the second transistor T2 may apply the reference voltage VREF to the first node N1. In the second period TP2A, the fifth transistor T5 may be turned on in response to the bias gate signal GB. The fifth transistor T5 may be turned on, so that the initialization voltage VSUS may be applied to the fourth node N4. The initialization voltage VSUS may be higher than the reference voltage VREF. Accordingly, in the second period TP2A, a negative gate-source voltage may be applied to the first transistor T1, and a threshold voltage of the first transistor T1 may be positively shifted. In the second period TP2A, the third transistor T3 may connect the fourth node N4 and the second node N2. In the second period TP2A, the third transistor T3 may diode-connect the first transistor T1. Accordingly, the first transistor T1 may operate as a diode in which a current flows from the second control electrode connected to the second node N2 to the second electrode connected to the third node N3. Additionally, a voltage of the second node N2 may be changed to a sum of the initialization voltage VSUS and the threshold voltage of the first transistor T1. The second capacitor C2 may store the threshold voltage of the first transistor T1 in the diode connection manner.

According to some embodiments, the threshold voltage compensation operation may be performed in the diode connection manner in the pixel circuit PXA, so that a compensation ability of the pixel circuit PXA according to some embodiments may be relatively improved compared with a pixel circuit in which a threshold voltage compensation operation is performed in a source follower manner.

Figure 7:
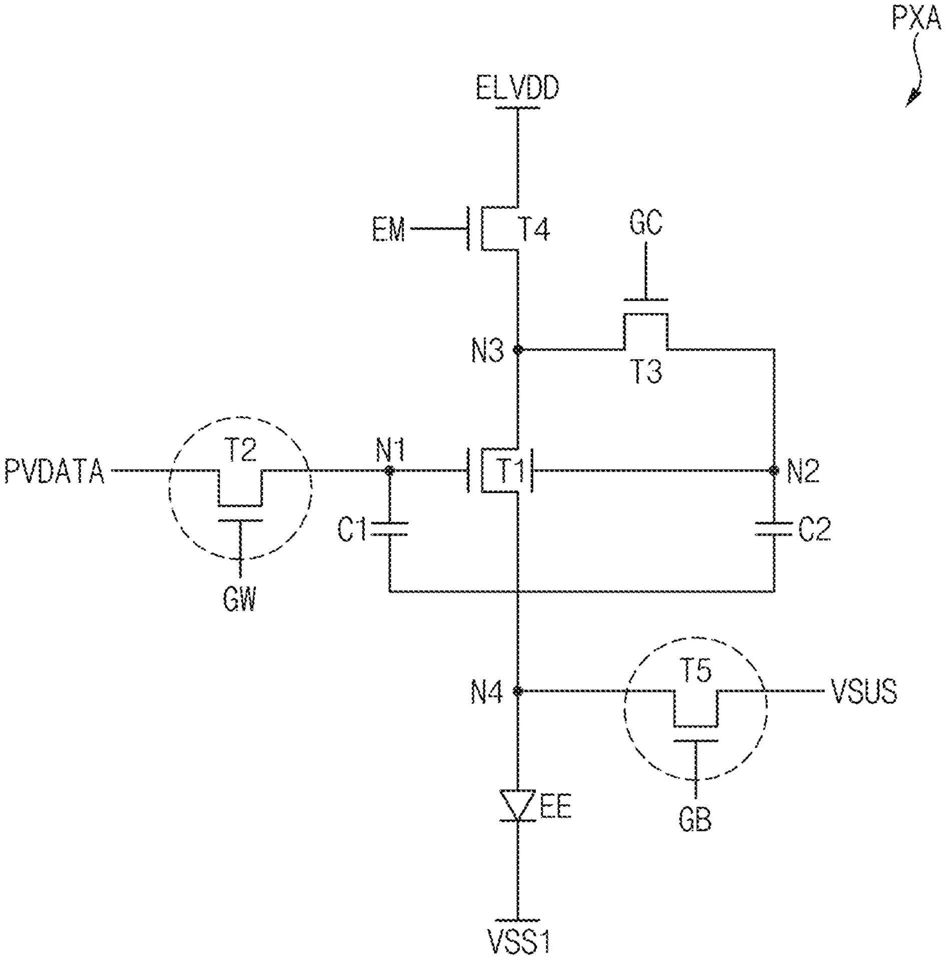
FIG. 7 is a circuit diagram illustrating an operation of a pixel circuit PXA of FIG. 3 in a third period TP3A of FIG. 3.

FIG. 7 is a circuit diagram illustrating an operation of a pixel circuit PXA of FIG. 3 in a third period TP3A of FIG. 3.

Referring to FIG. 1, FIG. 4 and FIG. 7, in the third period TP3A, the second transistor T2 may be turned on in response to the write gate signal GW. The second transistor T2 may be turned on, so that the pixel data voltage PVDATA may be applied to the first node N1. In the third period TP3A, the fifth transistor T5 may be turned on in response to the bias gate signal GB. The fifth transistor T5 may be turned on, so that the initialization voltage VSUS may be applied to the fourth node N4. In the third period TP3A, the first capacitor C1 may store the pixel data voltage PVDATA. For example, the first capacitor C1 may store a voltage difference of the pixel data voltage PVDATA and the initialization voltage VSUS.

Figure 8:
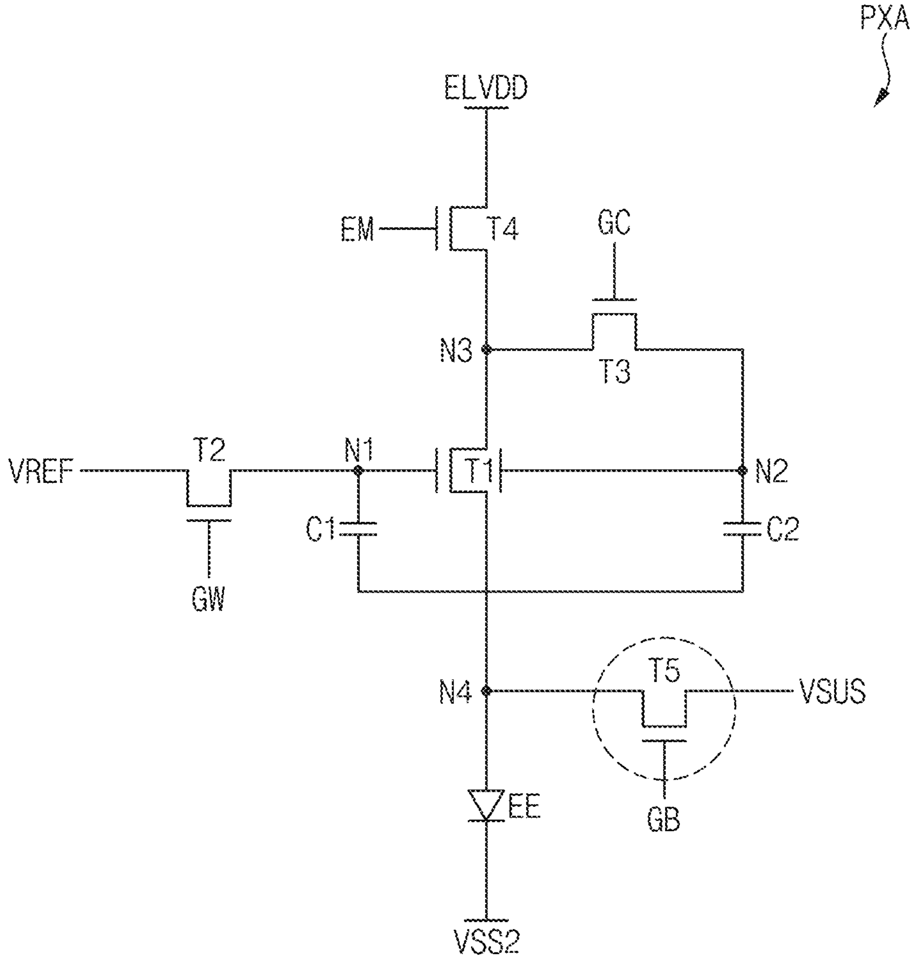
FIG. 8 is a circuit diagram illustrating an operation of a pixel circuit PXA of FIG. 3 in a fourth period TP4A of FIG. 3.

FIG. 8 is a circuit diagram illustrating an operation of a pixel circuit PXA of FIG. 3 in a fourth period TP4A of FIG. 3.

Referring to FIG. 1, FIG. 4 and FIG. 8, in the fourth period TP4A, the fifth transistor T5 may be turned on in response to the bias gate signal GB. The fifth transistor T5 may be turned on, so that initialization voltage VSUS may be applied to the fourth node N4. The second power voltage ELVSS may have the second low voltage VSS2. The second electrode of the light emitting element EE may be applied to the second low voltage VSS2.

Figure 9:
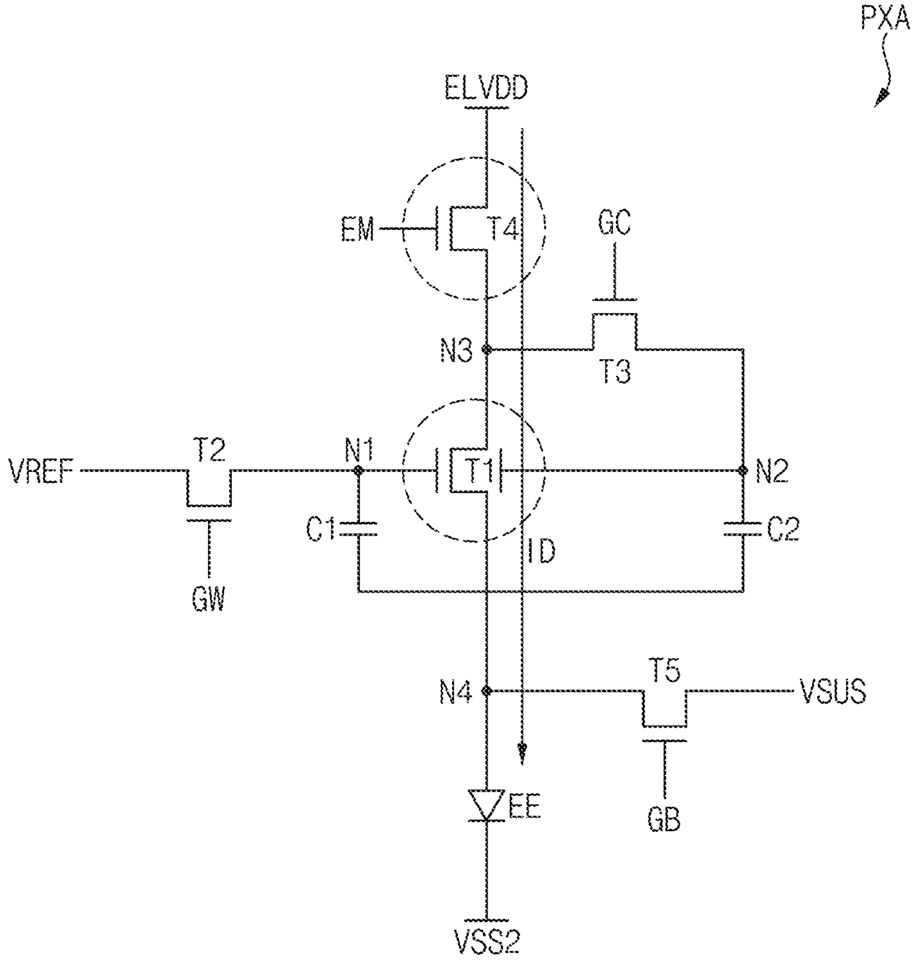
FIG. 9 is a circuit diagram illustrating an operation of a pixel circuit PXA of FIG. 3 in a fifth period TP5A of FIG. 3.

FIG. 9 is a circuit diagram illustrating an operation of a pixel circuit PXA of FIG. 3 in a fifth period TP5A of FIG. 3.

Referring to FIG. 1, FIG. 4 and FIG. 9, in the fifth period TP5A, the fourth transistor T5 may be turned on in response to the emission signal EM. The fourth transistor T4 may be turned on, so that the first power voltage ELVDD may be applied to the third node N3. In the fifth period TP5A, the third transistor T3 may be turned off in response to the compensation gate signal GC. The third transistor T3 may be turned off, so that the second node N2 and the third node N3 may not be connected. In the fifth period TP5A, the first transistor T1 may generate the driving current ID based on the voltage difference of the data voltage VDATA stored in the first capacitor C1 and the initialization voltage VSUS, and the threshold voltage of the first transistor T1 stored in the second capacitor C2. Accordingly, the light emitting element EE may emit light based on the driving current.

Figure 10:
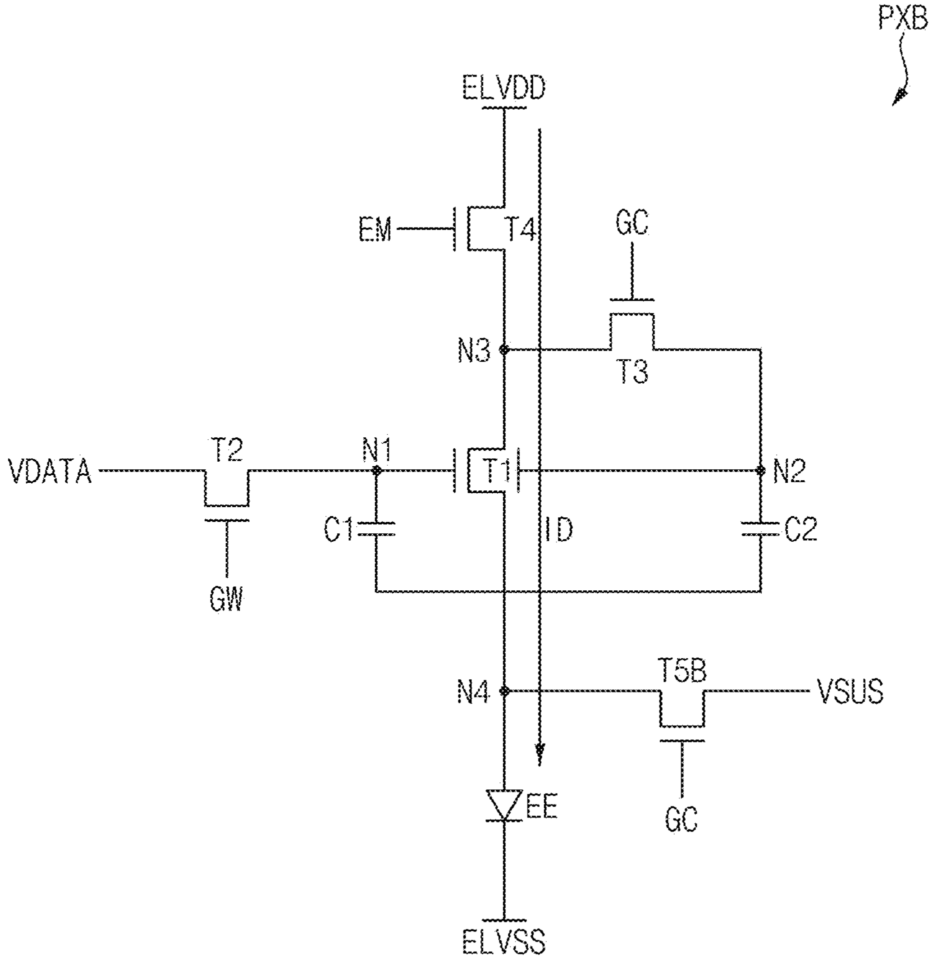
FIG. 10 is a circuit diagram illustrating an example of a pixel circuit PX included in a display device 1 of FIG. 1.

FIG. 10 is a circuit diagram illustrating an example of a pixel circuit PX included in a display device 1 of FIG. 1. Although FIG. 10 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring to FIG. 10, a pixel circuit PXB of FIG. 10 may include the first transistor T1, the second transistor T2, the third transistor T3, the fourth transistor T4, a fifth transistor T5B, the first capacitor C1, the second capacitor C2 and the light emitting element EE.

The pixel circuit PXB of FIG. 10 is substantially same as the pixel circuit PXA of FIG. 3 except that a control electrode of the fifth transistor T5B may receive the compensation gate signal GC, so that the same reference numerals will be used and any repetitive explanation concerning the above elements will be omitted.

The fifth transistor T5B may include a control electrode receiving the compensation gate signal GC, a first electrode receiving the initialization voltage VSUS and a second electrode connected to the fourth node N4. The fifth transistor T5B may apply the initialization voltage VSUS to the fourth node N4 in response to the compensation gate signal GC. For example, the fifth transistor T5 may be called as the initialization transistor or the light emitting element initialization transistor.

Figure 11:
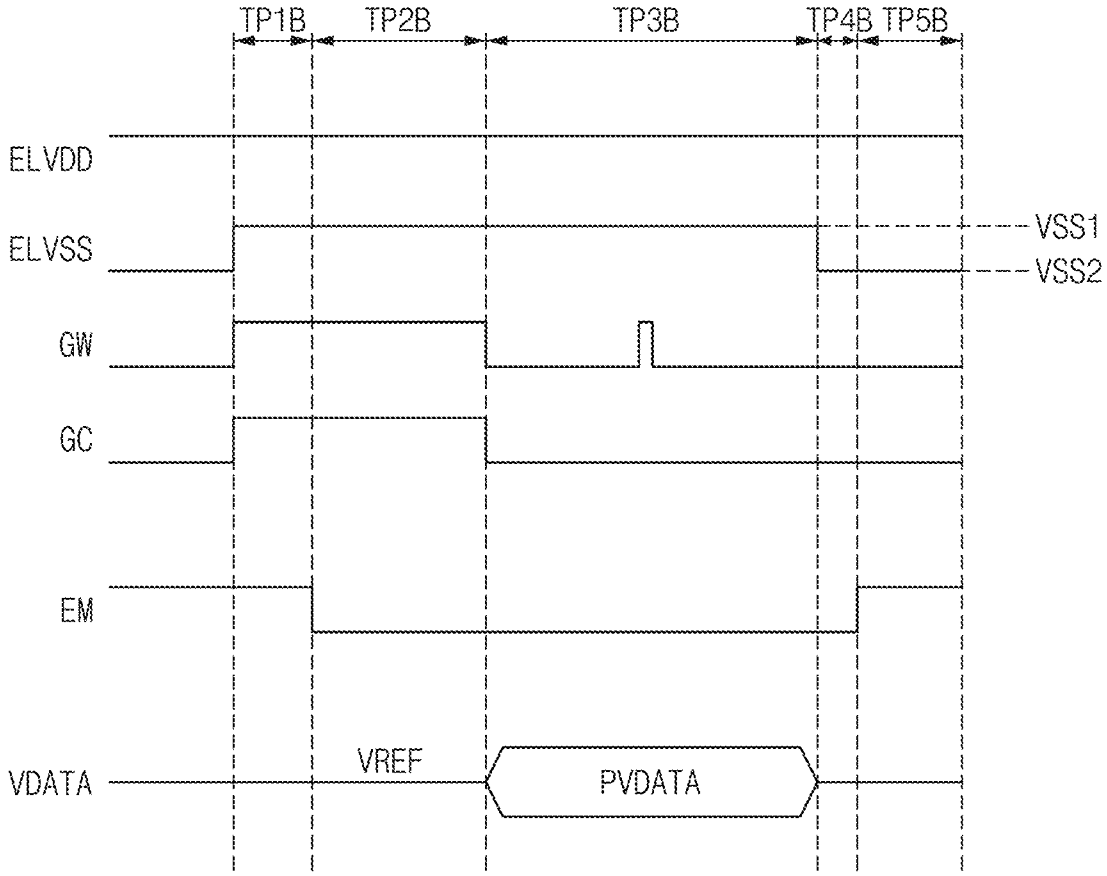
FIG. 11 is a timing diagram illustrating an example of signals applied to a pixel circuit PXB of FIG. 10.

FIG. 11 is a timing diagram illustrating an example of signals applied to a pixel circuit PXB of FIG. 10.

Referring to FIG. 1, FIG. 2, FIG. 10 and FIG. 11, a frame period in which the pixel circuit PXB is driven may include a first period TP1B, a second period TP2B, a third period TP3B, a fourth period TP4B and a fifth period TP5B.

In the first period TP1B, the second power voltage ELVSS may have the first low voltage VSS1, the write gate signal GW may have an activation level, the compensation gate signal GC may have an activation level, the emission signal EM may have an activation level, and the data voltage VDATA may have the reference voltage VREF. For example, the first period TP1B may be called as the initialization period.

In the second period TP2B following to the first period TP1B, the second power voltage ELVSS may have the first low voltage VSS1, the write gate signal GW may have an activation level, the compensation gate signal GC may have an activation level, the emission signal EM may have an inactivation level, and the data voltage VDATA may have the reference voltage VREF. For example, the second period TP2B may be called as the compensation period.

In the second period TP2B, the fourth transistor T4 may be turned off in response to the emission signal EM. In the second period TP2B, the second transistor T2 may apply the reference voltage VREF to the first node N1. In the second period TP2B, the fifth transistor T5 may apply the initialization voltage VSUS to the fourth node N4. The initialization voltage VSUS may be higher than the reference voltage VREF. Accordingly, in the second period TP2B, a negative gate-source voltage may be applied to the first transistor T1, and a threshold voltage of the first transistor T1 may be positively shifted. In the second period TP2B, the third transistor T3 may connect the fourth node N4 and the second node N2. In the second period TP2B, the third transistor T3 may diode-connect the first transistor T1. Accordingly, the first transistor T1 may operate as a diode in which a current flows from the second control electrode connected to the second node N2 to the second electrode connected to the third node N3. Additionally, a voltage of the second node N2 may be changed to a sum of the initialization voltage VSUS and the threshold voltage of the first transistor T1. The second capacitor C2 may store the threshold voltage of the first transistor T1 in the diode connection manner.

In the third period TP3B following to the second period TP2B, the second power voltage ELVSS may have the first low voltage VSS1, the write gate signal GW may have an activation level, the compensation gate signal GC may have an inactivation level, the emission signal EM may have an inactivation level, and the data voltage VDATA may have the pixel data voltage PVDATA. For example, the third period TP3A may be called as the writing period.

In the fourth period TP4B following to the third period TP3B, the second power voltage ELVSS may have a second low voltage VSS2, the write gate signal GW may have an inactivation level, the compensation gate signal GC may have an inactivation level, the emission signal EM may have an inactivation level, and the data voltage VDATA may have the reference voltage VREF. For example, the fourth period TP4A may be called as the emission waiting period or the holding period.

In the fifth period TP5B following to the fourth period TP4B, the second power voltage ELVSS may have the second low voltage VSS2, the write gate signal GW may have an inactivation level, the compensation gate signal GC may have an inactivation level, the emission signal EM may have an activation level, and the data voltage VDATA may have the reference voltage VREF. For example, the fifth period TP5A may be called as the emission period.

According to some embodiments, the pixel circuit PXB may have 5T2C structure. The pixel circuit PXB may include few transistors, so that an integration of the pixel circuit PXB may be relatively improved. Accordingly, the pixel circuit PXB may be applied to high-resolution display device.

Additionally, according to some embodiments, the threshold voltage compensation operation may be performed in the diode connection manner in the pixel circuit PXB, so that a compensation ability of the pixel circuit PXB according to some embodiments may be relatively improved compared with a pixel circuit in which a threshold voltage compensation operation is performed in a source follower manner.

Figure 12:
FIG. 12 is a diagram illustrating an example of a pixel circuit PX included in a display device 1 of FIG. 1 is located on a substrate 101.

FIG. 12 is a diagram illustrating an example of a pixel circuit PX included in a display device 1 of FIG. 1 is located on a substrate 101.

Referring to FIG. 1 and FIG. 12, the pixel circuit PX may be located (or arranged) on a substrate 101. According to some embodiments, the substrate 101 may be a silicon-based substrate. According to some embodiments, the pixel circuit PX may be located on a silicon-based substrate. The pixel circuit PX may be located on a silicon-based substrate, so that voltage levels of input signals applied to the pixel circuit PX may be set more precisely. For example, the first driving voltage DV1 may be relatively stably output between the driving high voltage and the driving low voltage. Additionally, the second driving voltage DV2 may be relatively stably output between the driving high voltage and the driving low voltage.

The silicon-based substrate may include a single-crystal silicon wafer, a polycrystalline silicon wafer, or an amorphous silicon wafer. A semiconductor layer may be formed on the silicon-based substrate through a semiconductor process. For example, the silicon substrate on which the semiconductor layer is formed may be a silicon semiconductor substrate.

According to some embodiments, the semiconductor layer may be formed on the silicon-based substrate through a Complementary Metal Oxide Semiconductor (CMOS) process. The semiconductor layer may include a pixel circuit in the form of a CMOS. For example, the pixel circuit PX may include a CMOS circuit including a P-type transistor and an N-type transistor. Accordingly, the display device 1 may be a display-on-silicon (DOS, or, LEDoS (Light Emitting Diode on Silicon)) having a light emitting structure on a silicon semiconductor substrate.

According to some embodiments, at least one of the transistors included in the pixel circuit PX may be an N-type transistor. The pixel circuit PX may be located on the silicon-based substrate, so that at least one of the transistors included in the pixel circuit PX may be relatively stably formed as an N-type transistor.

Figure 13:
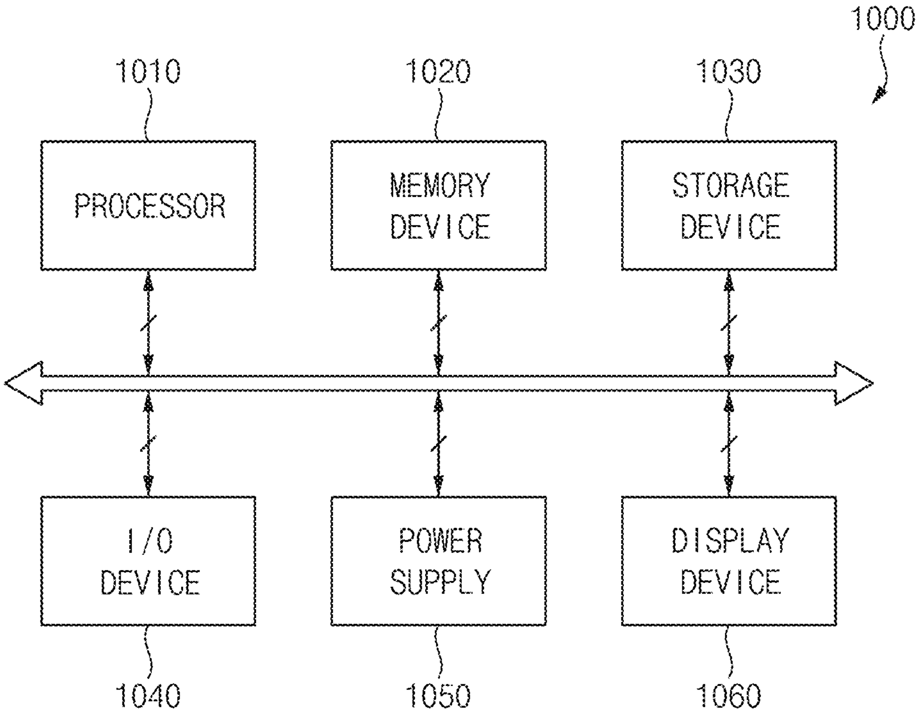
FIG. 13 is a block diagram illustrating an electronic device according to some embodiments of the present disclosure.
Figure 14:
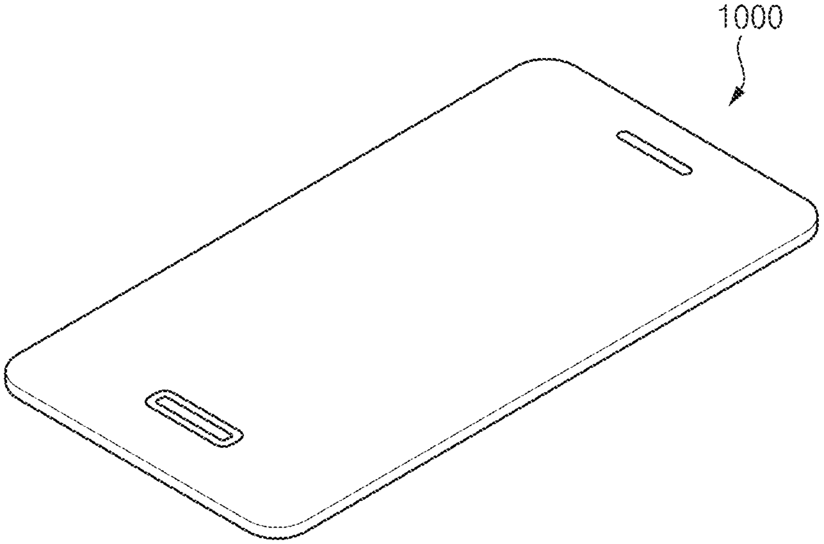
FIG. 14 is a diagram illustrating an example in which the electronic device of FIG. 13 is implemented as a smart phone.

FIG. 13 is a block diagram illustrating an electronic device 1000 according to some embodiments of the present inventive concept. FIG. 14 is a diagram illustrating an example in which the electronic device of FIG. 13 is implemented as a smart phone.

Referring to FIG. 13, the electronic device 1000 may include a processor 1010, a memory device 1020, a storage device 1030, an input/output (I/O) device 1040, a power supply 1050, and a display device 1060. Here, the display device 1060 may be the display device of FIG. 1. Additionally, the electronic device 1000 may further include a plurality of ports for communicating with a video card, a sound card, a memory card, a universal serial bus (USB) device, other electronic device, etc.

According to some embodiments, as illustrated in FIG. 14, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 14, the electronic device of the present disclosure is shown implemented as a smartphone, but embodiments according to the present disclosure are not limited thereto. The electronic device may be a television, a monitor, a laptop computer, or a tablet. Additionally, the electronic device may be a car.

Figure 15:
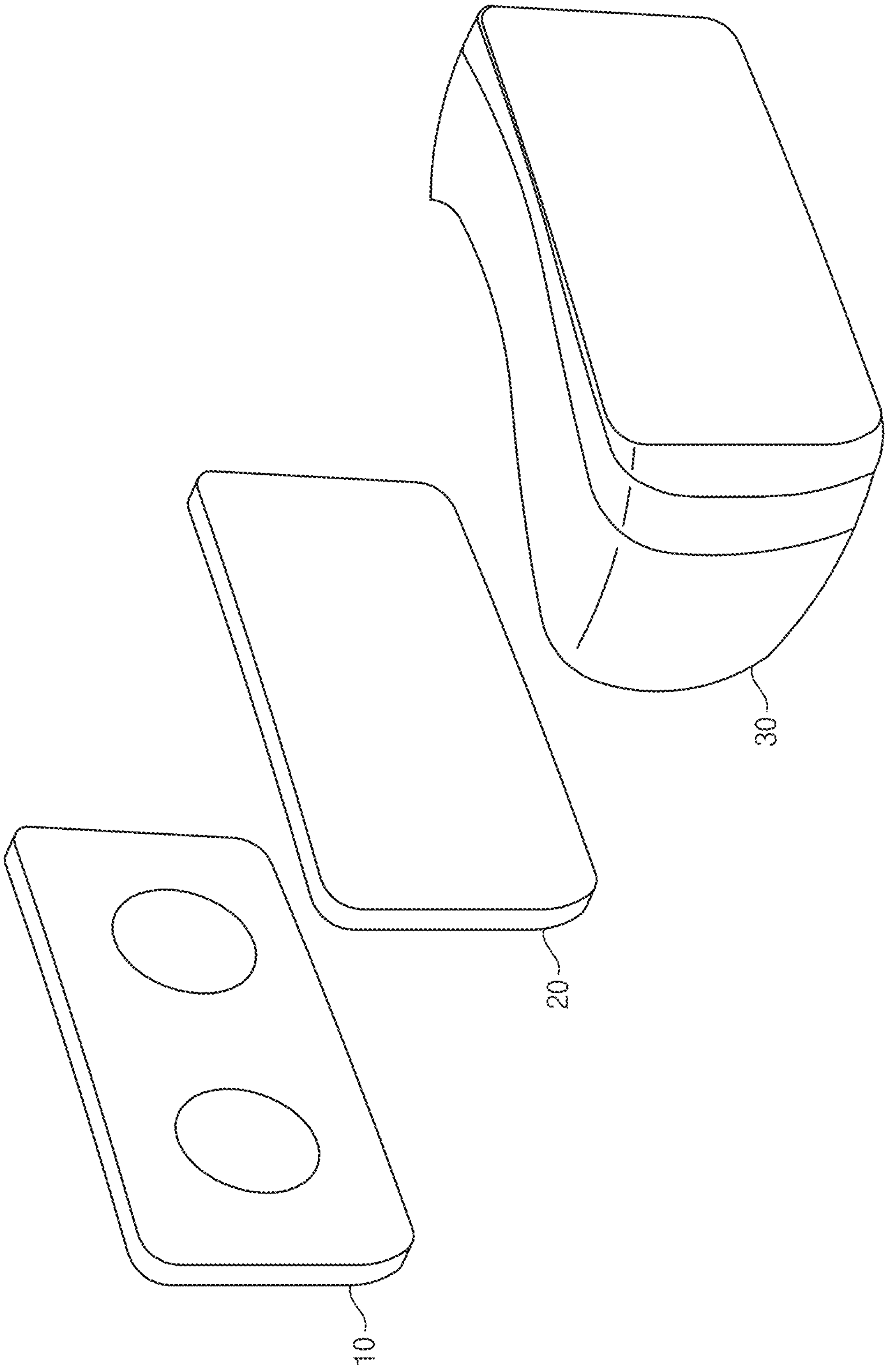
FIG. 15 is a diagram illustrating an example in which the electronic device of FIG. 13 is implemented as a virtual reality display system.

FIG. 15 is a diagram illustrating an example in which the electronic device of FIG. 13 is implemented as a virtual reality display system.

Referring to FIG. 13 and FIG. 15, the virtual reality display system may include a lens unit 10, a display apparatus 20 and a housing 30. The display apparatus 20 is located adjacent to the lens unit 10. The housing 30 may receive the lens unit 10 and the display apparatus 20. Although the lens unit 10 and the display apparatus 20 are received in a first side of the housing 30 in FIG. 14, the present disclosure may not be limited thereto. Alternatively, the lens unit 10 may be received in a first side of the housing 30 and the display apparatus may be received in a second side of the housing 30. When the lens unit 10 and the display apparatus 20 are received in the housing 30 in opposite sides, the housing 30 may have a transmission area to transmit a light.

For example, the virtual reality display system may be a head mounted display system which is wearable on a head of a user. According to some embodiments, the virtual reality display system may further include a head band to fix the virtual reality display system on the head of the user.

Alternatively, the virtual reality display system may have the form of smart glasses implemented in the shape of glasses.

Additionally, the electronic device may be implemented as an augmented reality display system, a mixed reality display system, or an extended reality display system.

The display device according to the embodiments may be applied to a display device included in a computer, a notebook, a mobile phone, a smart phone, a smart pad, a PMP, a PDA, an MP3 player, or the like.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A pixel circuit comprising:

a first transistor including a first control electrode connected to a first node, a second control electrode connected to a second node, a first electrode connected to a third node and a second electrode connected to a fourth node;

a second transistor including a control electrode configured to receive a write gate signal, a first electrode configured to receive a data voltage and a second electrode connected to the first node;

a third transistor including a control electrode configured to receive a compensation gate signal, a first electrode connected to the third node and a second electrode connected to the second node;

a fourth transistor including a control electrode configured to receive an emission signal, a first electrode connected configured to receive a first power voltage and a second electrode connected to the third node;

a fifth transistor including a control electrode configured to receive a bias gate signal, a first electrode configured to receive an initialization voltage and a second electrode connected to the fourth node;

a first capacitor including a first electrode connected to the first node and a second electrode connected to the fourth node;

a second capacitor including a first electrode connected to the second node and a second electrode connected to the fourth node; and a light emitting element including a first electrode connected to the fourth node and a second electrode configured to receive a second power voltage.

2. The pixel circuit of claim 1, wherein the first capacitor is configured to store the data voltage, and the second capacitor is configured to store a threshold voltage of the first transistor.

3. The pixel circuit of claim 1, wherein the second power voltage transitions between a first voltage and a second voltage lower than the first voltage.

4. The pixel circuit of claim 1, wherein a frame period in which the pixel circuit is driven includes first to fifth periods, and wherein in the first period, the first power voltage has a first low voltage, the write gate signal has an activation level, the compensation gate signal has an activation level, the bias gate signal has an activation level, the emission signal has an activation level, and the data voltage has a reference voltage.

5. The pixel circuit of claim 4, wherein in the second period following to the first period, the compensation gate signal has an activation level, the bias gate signal has an activation level, and the emission signal has an inactivation level.

6. The pixel circuit of claim 5, wherein in the second period, the fifth transistor is configured to apply the initialization voltage to the fourth node in response to the bias gate signal, wherein in the second period, the third transistor is configured to connect the third node and the second node in response to the compensation gate signal, and wherein the second capacitor is configured to store a threshold voltage of the first transistor through a diode-connection.

7. The pixel circuit of claim 6, wherein the initialization voltage is higher than the reference voltage.

8. The pixel circuit of claim 6, wherein the initialization voltage is equal to or lower than the first low voltage.

9. The pixel circuit of claim 8, wherein in the second period, a negative gate-source voltage is applied to the first transistor, and the threshold voltage of the first transistor is positively shifted.

10. The pixel circuit of claim 5, wherein in the third period following to the second period, the write gate signal has an activation level, and the data voltage has a pixel data voltage, and wherein in the third period, the second transistor is configured to apply the pixel data voltage to the first node in response to the write gate signal.

11. The pixel circuit of claim 10, wherein in the fourth period following to the third period, the bias gate signal has an activation level, and the second power voltage has a second low voltage lower than the first low voltage.

12. The pixel circuit of claim 11, wherein in the fifth period following to the fourth period, the emission signal has an activation level, the bias gate signal has an inactivation level, the second power voltage has the second low voltage, and wherein in the fifth period, the first transistor applies a driving current generated based on a voltage of the first node and a voltage of the second node to the light emitting element.

13. A display device comprising:

a display panel including a pixel circuit;

a gate driver configured to output a gate signal to the pixel circuit;

an emission driver configured to output an emission signal to the pixel circuit;

a data driver configured to apply a data voltage to the display panel; and a driving controller configured to control the gate driver, the emission driver and the data driver, wherein the pixel circuit includes:

a first transistor including a first control electrode connected to a first node, a second control electrode connected to a second node, a first electrode connected to a third node and a second electrode connected to a fourth node;

a second transistor including a control electrode configured to receive a write gate signal, a first electrode configured to receive the data voltage and a second electrode connected to the first node;

a third transistor including a control electrode configured to receive a compensation gate signal, a first electrode connected to the third node and a second electrode connected to the second node;

a fourth transistor including a control electrode configured to receive the emission signal, a first electrode configured to receive a first power voltage and a second electrode connected to the third node;

a fifth transistor including a control electrode configured to receive a bias gate signal, a first electrode configured to receive an initialization voltage and a second electrode connected to the fourth node;

a first capacitor including a first electrode connected to the first node and a second electrode connected to the fourth node;

a second capacitor including a first electrode connected to the second node and a second electrode connected to the fourth node; and a light emitting element including a first electrode connected to the fourth node and a second electrode configured to receive a second power voltage.

14. The display device of claim 13, wherein the first capacitor is configured to store the data voltage, and the second capacitor is configured to store a threshold voltage of the first transistor.

15. The display device of claim 13, wherein a frame period in which the pixel circuit is driven includes a compensation period, and wherein in the compensation period, the write gate signal has an activation level, the compensation gate signal has an activation level, the bias gate signal has an activation level, and the emission signal has an inactivation level.

16. The display device of claim 15, wherein in the compensation period, the second transistor applies a reference voltage to the first node in response to the write gate signal, and the fifth transistor applies to initialization voltage to the fourth node in response to the bias gate signal, wherein in the compensation period, the third transistor connects the third node and the second node in response to the compensation gate signal, and wherein the second capacitor is configured to store a threshold voltage of the first transistor through a diode-connection.

17. The display device of claim 16, wherein the initialization voltage is higher than the reference voltage.

18. The display device of claim 17, wherein in the compensation period, a negative gate-source voltage is applied to the first transistor, and the threshold voltage of the first transistor is positively shifted.

19. The display device of claim 13, wherein the compensation gate signal, the emission signal, the bias gate signal are global signal which is applied to at least two pixel-rows of pixel-rows with a same timing.

20. An electronic device comprising:

a display panel including a pixel circuit;

a gate driver configured to output a gate signal to the pixel circuit;

an emission driver configured to output an emission signal to the pixel circuit;

a data driver configured to apply a data voltage to the display panel;

a driving controller configured to control the gate driver, the emission driver and the data driver based on an input control signal; and a processor configured to output the input control signal, wherein the pixel circuit includes:

a first transistor including a first control electrode connected to a first node, a second control electrode connected to a second node, a first electrode connected to a third node and a second electrode connected to a fourth node;

a second transistor including a control electrode configured to receive a write gate signal, a first electrode configured to receive the data voltage and a second electrode connected to the first node;

a third transistor including a control electrode configured to receive a compensation gate signal, a first electrode connected to the third node and a second electrode connected to the second node;

a fourth transistor including a control electrode configured to receive the emission signal, a first electrode configured to receive a first power voltage and a second electrode connected to the third node;

a fifth transistor including a control electrode configured to receive a bias gate signal, a first electrode configured to receive an initialization voltage and a second electrode connected to the fourth node;

a first capacitor including a first electrode connected to the first node and a second electrode connected to the fourth node;

a second capacitor including a first electrode connected to the second node and a second electrode connected to the fourth node; and a light emitting element including a first electrode connected to the fourth node and a second electrode configured to receive a second power voltage.

* * * * *